Patented Dec. 5, 1944

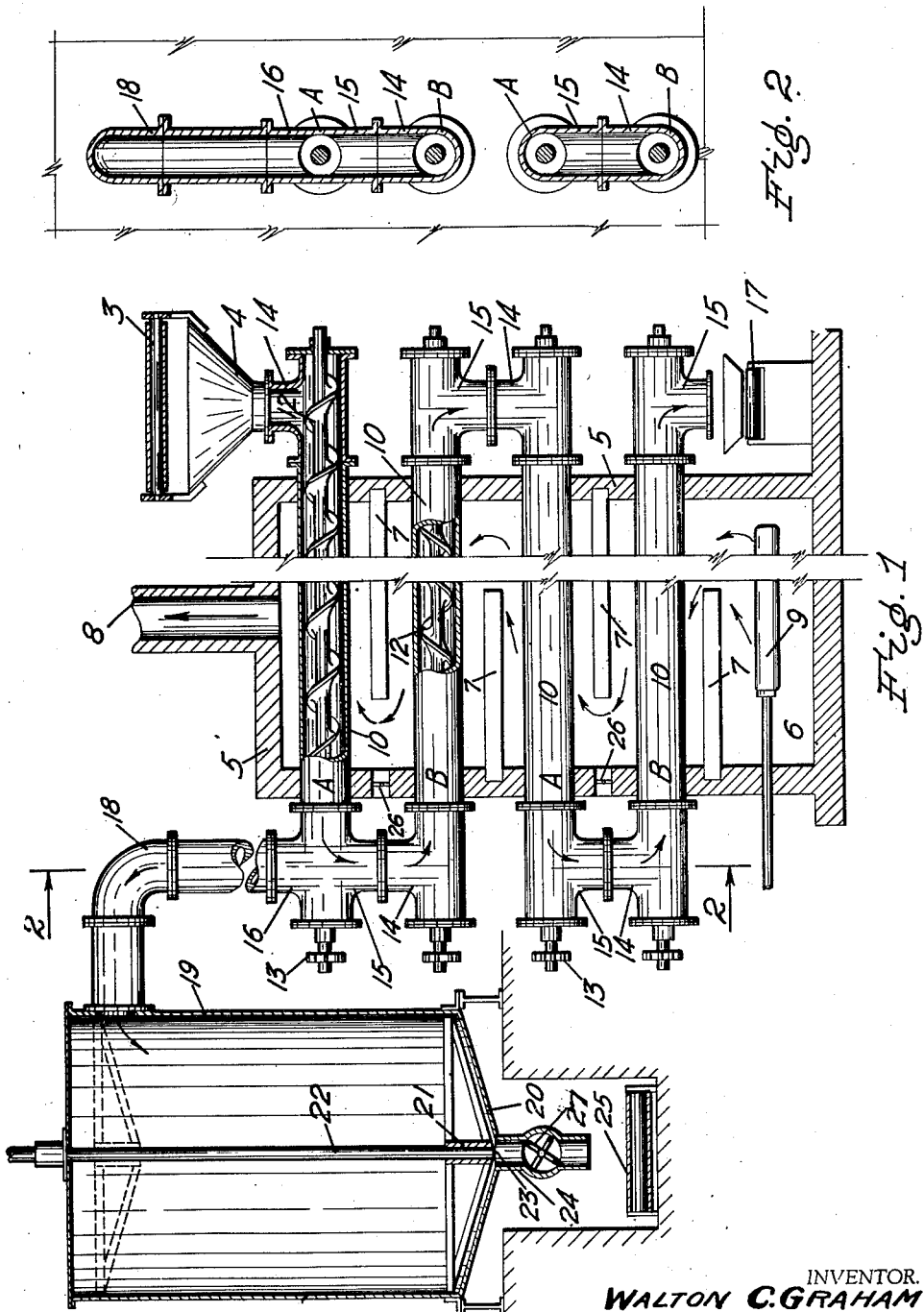

2,364,524

UNITED STATES PATENT OFFICE 2,364,524

CONVERSION PROCESS FOR FERTILIZER MATERIALS

Walton C. Graham, Denver, Colo., assignor, by mesne assignments, to Potash Company of America, Denver, Colo., a corporation of Colorado Application March 11, 1940, Serial No. 323,265

3 Claims. (Cl. 23—100)

This invention relates to a conversion process for fertilizer materials and more particularly relates to the conversion of potassium chloride and ammonium sulfate into potassium sulfate and ammonium chloride.

In recent years the use of chemical salts for fertilization of soils has developed to a considerable degree in this country and in conjunction with such development, much research and study has been devoted to the action of various salts in the soils.

The three principal fertilizing compositions are potash, nitrogen and phosphoric acid which are only obtained commercially in some chemical combination. For example, the potash will be produced as chloride or sulfate; the nitrogen as ammonium sulfate, or nitrate, or as sodium nitrate, and the phosphoric acid as calcium phosphate, etc.

In the use of such chemical salts in the soils, it has been discovered that fertilizers containing the chloride radical are harmful to certain crops, particularly tobacco and citrus fruits, while the sulfates are beneficial to such crops. As a result, there is a demand in this country for a certain tonnage of potash in the form of sulfate, which amounts to somewhat less than ten per cent of the total annual consumption.

However, because it is so essential to these crops, the consumers have been paying a considerably higher price per unit of potash in the form of sulfate than other consumers are required to pay per unit of potash in the form of chloride. This has been due in part at least to the expensive manufacturing process required for the production of the sulfate.

Potassium chloride occurs in vast natural deposits in Europe and Asia in a form and richness requiring an inexpensive process for its concentration to a commercial product. In recent years, vast deposits of potash minerals have been discovered in the United States, notably in Texas and New Mexico, and these deposits are being exploited commercially, producing only potassium chloride, as the most prevalent mineral is in that form.

In Europe, notably in Germany, potassium sulfate has been manufactured for many years from potassium chloride by interaction with magnesium sulfate (kieserite) which is found in the German potash deposits along with the potassium chloride. Through the year 1939 and prior thereto, practically all potassium sulfate consumed in the United States in these special fertilizers, has been imported from Europe.

Unlike the European processes in which only one valuable constituent is produced, the present process contemplates the treatment of certain materials to produce as a result of its conversion, products having a higher market value than the cost of processing, plus the cost of the raw materials of the treatment.

It is an object of the present invention to provide a means of transposing acid radicals from one fertilizer material to another, in order that a form of potash may be provided which is essential for certain crops, while at the same time providing a nitrogen carrying compound adapted for general fertilizer usage and which is valuable also for other industrial purposes.

Another object of the invention is the provision of the method for transposing the acid radicals of potassium chloride and ammonium sulfate to form potassium sulfate and ammonium chloride and making a dry separation thereof.

Theoretically, potassium sulfate may be manufactured from potassium chloride by transposition with another soluble compound carrying the sulfate radical. However, from an economical standpoint, this is not so simple. As an example, the use of sodium sulfate for this purpose is cited. Sodium sulfate is manufactured as a by-product and also is found in natural deposits in the United States.

Consequently, it may be considered a relatively cheap composition. The products of the transformation using potassium chloride and sodium sulfate would be potassium sulfate and sodium chloride, evaporation being required to recover the salt which is of extremely low value commercially. Consequently, such a conversion only produces one final product of real commercial value.

In contradistinction, the transformation by the methods of the present invention results in two final products, each having a definite place in industry and consequently a real market value. Further, by providing simple and inexpensive methods of conversion, the present process may be utilized to enhance the value of the raw materials treated.

In this connection, the process has been designed especially for use in or near the consuming market where transportation costs, added to production costs, will not place an economic burden on American producers whose goods are in competition with the products of foreign production.

In performing the present process, potassium chloride and ammonium sulfate are the materials taken for reaction. The United States production of potassium chloride is now approaching the tonnage consumption total of the salt and consequently large quantities of the material are available for the present treatment.

Similarly, ammonium sulfate is a by-product of coke ovens and is produced in this country in excess of domestic requirements, with the result that the price has driven the previously dominant nitrogen carrier, Chile nitrate, almost out of the United States market. Thus, it will be seen that the two essential materials of the present process are relatively cheap, based upon present standards.

When potassium chloride and ammonium sulfate are brought into reaction under proper conditions, there will be produced as products of the reaction, potassium sulfate and ammonium chloride. The reaction is stated by chemical formula as follows:

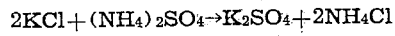

$$2KCl + (NH_4)_2SO_4 \rightarrow K_2SO_4 + 2NH_4Cl$$

The products of the reaction have an enhanced value; the nitrogen in the form of chloride being equal to or greater than its value in the form of ammonium sulfate and is suited for use as a nitrogen carrier in fertilizer compounds on crops, such as cotton, for example, where, due to its being in a more concentrated form, a benefit of approximately twenty per cent is derived in transportation costs. Ammonium chloride also is sold as an industrial chemical under its trade name of Sal Ammoniac, and as such, has a valuation in excess of its value as a nitrogen carrier in fertilizer.

As previously explained, the lack of a domestic supply of potassium sulfate and the relatively high prices of the same resulting from expensive foreign manufacture, thus provide a means for the creation of two relatively valuable products from two relatively cheap and inexpensive ones.

While various means may be provided for performing the process, as hereinafter described, apparatus well suited for the purposes of the present invention has been illustrated in the accompanying drawing. To afford a better understanding of the invention, reference is now made to the drawing in the several views of which like parts have been designated similarly and in which:

Figure 1 is a side elevation partially in section of a retort and condenser assembly adapted to perform the present process; and Figure 2 is a section taken along the line 2—2 of Figure 1.

Potassium chloride and ammonium sulfate in finely divided condition are initially dry mixed in approximately their molecular combining proportions in any suitable manner, and this mixture comprises the feed of the present treatment.

An endless conveyor 3 delivers the mixture at a predetermined rate into a hopper 4 from which it passes into a retort 5 constructed of refractory materials or other heat resistant compositions, for heating in a manner to be described hereinafter.

The retort comprises a combustion chamber 6 divided by baffles 7 into a series of compartments, and is provided at its top with a chimney 8 for removal of the products of combustion. A burner or burners 9, located in the lower portion of combustion chamber 6, initiates the combustion within such chamber. The baffles 7 alternately project from opposed walls of the combustion chamber and terminate in spaced relation to the opposing wall to provide a circuitous passage for the products of combustion between the burner 9 and the chimney 8.

A conduit 10 extends through opposed walls of retort 5 along each compartment determined by the location of baffles 7. These conduits 10 are designated in Figure 1 as comprising two groups, A and B, with conveying screws 12 of the left-hand type in conduits A and of the right-hand type in conduits B. The screws 12 are suitably driven, and as here shown, a chain drive 13 connected with a prime mover (not shown) is employed.

The feed inlet 14 to the uppermost compartment A receives the mixture descending through hopper 4 and directs the same onto screw 12 by the action of which it is moved through the retort to a discharge opening 15 in the bottom surface of the opposite end of conduit A. Another opening 16 in the upper surface of conduit A permits escape of vapors generated by the action of the retort 5.

The material passing through opening 15 of conduit A descends into the feed inlet 14 of conduit B where it is moved by the action of the right-hand screw 12 to a similar discharge opening 15 in conduit B. This action is repeated in succeeding levels, with the discharge passing through the outlet 15 of the lowermost conduit B descending onto a conveyor 17, here shown as being of the endless type, by which it is removed to a suitable place of storage.

The vapors rising through outlet 16 travel through conduit 18 and are delivered into a condenser 19.

In the form here illustrated, the condenser 19 comprises a cylindrical receptacle having a conical bottom 20 and a scraper element 21 mounted for rotation therein on a shaft 22. The shaft 22 is also mounted for lengthwise movement to permit an oscillatory movement of the scraper 21 within condenser 19, in addition to its rotary movement therein. A discharge opening 23 in the sump portion of condenser 19 delivers the material moved thereto by the action of scraper 21 into a conduit 24 by which it is delivered by a star feeder 27 acting as a vapor trap onto a conveyor 25, here illustrated as being of the endless type.

In performing the process of the present invention in the apparatus just described, it is necessary to exercise a controlled heating in order that the ammonium chloride may be vaporized or sublimed and conducted to condenser 19 where it passes to a solid state, while the potassium sulfate of the reaction is discharged as a residue of the retort action. A convenient means for controlling the temperature is the provision of dampers 26 to permit the inlet of air as required.

This regulation of temperature serves to control the subliming action, to the end that ammonium sulfate is not decomposed. Ammonium sulfate melts at 513° C. and simultaneously decomposes. As ammonium chloride is vaporized to some extent at comparatively low temperatures and completely vaporized at around 350° C., the process to be efficient must involve heating in excess of 350°, but not in excess of 513°.

As any quantity of the mixture of potassium chloride and ammonium sulfate treated on a commercial scale would constitute a considerable mass, ordinary methods of retort heating will not be satisfactory. Thus, if such a mass which is a poor conductor is heated sufficiently to bring the inner portion of the mass to or above 350° C., the outermost portions of the mass will be heated in excess of 513° C., causing decomposition of a portion of the material.

Similarly, if heating is maintained to keep the outer surfaces of the mass under 513° C. temperature, the inner portions thereof will be insufficiently heated to produce the desired reaction, with consequent waste of material and added cost to process.

The present invention eliminates these difficulties by the provision of the tubular passages and the cooperating screws, to the extent that loss of material through improper reaction is reduced to insignificant proportions and pure products are obtained at the condenser and retort discharges.

Upon heating the mixture fed through hopper 4, a state of incipient fusion sets in before the evolution of ammonium chloride vapors is at all pronounced. This results in a friable mass which under agitation by the screws 12 falls into small independent granules of the general aspect of a fine sand.

In the top section A of the retort, the material is gradually heated to approach the temperature of sublimation as it is being moved toward the outlet 15 by the action of the screw or scroll 12. From the top section A, the material passes by gravity into the uppermost section B where the direction of movement is reversed and the mational passes through to the discharge opening 15 at the opposite end. At each succeeding lower elevation, the temperature of the material under treatment increases, subject to regulation by the dampers 26, until complete sublimation has been obtained when further temperature increases are restrained.

As the vapor is driving off by the heat, it passes through the upper portion of each section to the section next above through the same openings 14 and 15 through which the solids pass until it finally reaches the opening 16 from which it travels through conduit 18 into condenser 19.

Where it is desired to avoid the long travel of vapors through the retort from the lowermost sections to the uppermost section A, a by-pass arrangement may be employed for the direct movement from the lowermost conduit A to the discharge outlet 16 of the uppermost conduit A. As such an arrangement is obvious to those skilled in the art, illustration of the same appears unnecessary.

The temperature of the walls of the conduit sections 10 is maintained within such a range of temperature that the granular material being moved therealong will be heated within the desired temperature range, but not in excess of its upper limit, namely, 513° C. This heating is accomplished partly by direct contact with the conduit walls and partly by radiation from the retort walls. In order that a close regulation may be maintained at all times, suitable thermometers (not illustrated) may be provided at the ends of the respective sections to measure the heat to which the material is subjected.

In addition to its function as a motive medium for the travel of the material through the respective sections 10, the screws 12 also act as agitating elements to bring new surfaces of the material under treatment into direct contact with the conduit walls. In this way, a uniform temperature is maintained throughout the mass in any given section, although differential temperatures will be maintained in successive sections.

To further insure the efficiency of the operation, the rate of feed delivery and rate of impelling movement in the respective sections 10 is subject to regulation, to the end that at no time is more than one-half of the space of the sections 10 filled with solid matter under treatment. By so regulating the volume in conjunction with the temperature, adequate space is provided for travel of the vapors to the condenser.

The condensation of the vapors of ammonium chloride is a relatively simple matter, requiring a theoretical abstraction of 142 B. t. u. per pound of solid ammonium chloride. The condensation will occur at temperatures well in excess of the boiling point of water. For this reason, a type of condenser should be used in which the removal of solid ammonium chloride is performed mechanically and the condenser 19 is well suited for this purpose.

The cooling may be by means of a blast of air, or water sprays, or by locating the apparatus out of doors where it is subjected to the action of atmospheric air. The latter arrangement has been illustrated in Figure 1, although it will be readily apparent to those skilled in the art that a blast of air may be applied to the condenser 19, if desired.

In operation, the shaft 22 oscillates the scraper 21 slowly throughout the length of the chamber 19, and the top, bottom and periphery of the scraper 21 are all provided with scraping surfaces to remove the ammonium chloride forming on the condenser walls.

To prevent condensation in the conductive system, the various conduits 16, 15, 18, etc. preferably are well insulated or may be provided with a concentric jacket through which the hot gases of combustion may be drawn from the retort and forced therethrough by the action of a fan.

Preferably, the condenser 19 is formed of suitable corrosion-resistant material, such as glazed crockery, chrome nickel alloys or the like. Similarly, the sections 10 of the retort preferably consist of cast iron piping lined with fireclay tiles or other corrosion-resistant and heat-retaining materials.

While the apparatus illustrated in the drawing is well suited for performing the present process, it will be understood that numerous variations in the structural arrangement may be devised without impairing the proper functioning. Thus, the number of sections 10 may be varied according to requirements and so long as the essential features of control of the heating action and substantially unrestricted movement of vapors are maintained, the objects of the present invention will be satisfied. Similarly, variations in proportion of the retort and condenser will be desirable under various conditions of operation, and where desired, a battery of retorts or a battery of condensers, or both, may be employed.

Likewise, retorts and condensers of different structural design may be utilized so long as they satisfy the requirements of the present invention.

To afford a better understanding of the economies of the present operation, an example is cited, using costs applicable as of January 1, 1940.

Debit

Per ton K₂SO₄

.85 ton KCl @ 50¢ unit K₂O equivalent, net _____ $26.86
.76 ton (NH₄)₂SO₄ @ $1.25 unit nitrogen__ 20.14

Value of materials_____ $47.00

Credit 1.00 ton K₂SO₄ @ $36.00 for 90%, net____ $36.00
.62 ton NH₄Cl @ $1.25 unit nitrogen_____ 20.14

Value of products _____ $56.14
Less value of materials_____ 47.00

Increase in value_____ $ 9.14
Less conversion costs_____ 4.00

Operating profit _____¹ $ 5.14

¹ Per ton sulfate.

The above balance in which .85 ton potassium chloride reacting with .76 ton ammonium sulfate produce 1.0 ton potassium sulfate and .62 ton of ammonium chloride which contains exactly the same amount of nitrogen as the .76 ton of ammonium sulfate charged.

This balance throws all costs upon the potassium sulfate, assuming that the ammonia in the form of chloride will be no more valuable than it was in the form of sulfate.

As a matter of fact, the ammonium chloride is acceptable as a nitrogen carrier in fertilizer compounds used on general crops, such as cotton, and due to being in a more concentrated form, it is actually worth somewhat more at the same price per unit of nitrogen as there will be a saving of approximately twenty per cent in transportation charges on the ammonium chloride, as compared to the same amount of nitrogen in the form of sulfate.

Further, ammonium chloride as an industrial chemical under its trade name of Sal Ammoniac is widely used in industry at a valuation far in excess of its value as a nitrogen carrier in fertilizer.

If only half the ammonium chloride produced as a result of the operation of the process of this invention would be sold at half the present market price of Sal Ammoniac and the balance as a nitrogen carrier for fertilizer at the price taken in the above balance, it would be possible to sell the potassium sulfate at a materially reduced price to the fertilizer consumer and still realize a satisfactory profit and return on the capital investment in a plant using this invention.

In the preferred practice of the invention, the heating action will be so controlled that the material entering the retort will be brought to a state of incipient fusion, while maintained at temperatures less than 350° C., and thereafter the agitation imparted by the screw conveyors will reduce the fused mass to a granular condition.

After reaching such granular condition, the material is progressively heated until a temperature of 350° C. is reached, whereupon by suitable regulation, the temperature is maintained at or near 350° until the reaction is complete.

While it is obvious that the methods hereinbefore described are applicable to batch methods of treatment, the process is of particular value in that it provides for a continuous operation with a continuous feed to the retort, a continuous discharge of potassium sulfate in purified form therefrom and a continuous condensation and discharge of solid ammonium chloride from the process.

Changes and modifications may be availed of within the spirit and scope of the invention as defined in the hereunto appended claims.

What I claim and desire to secure by Letters Patent is:

1. The process for producing fertilizer compositions, which comprises the intermixture of potassium chloride and ammonium sulphate in dry condition in amounts approximating their molecular combining proportions, inducing a chemical reaction to transpose the acid radicals of the constituent materials by moving the material through a succession of physically separated treatment stages, heating the intermixture in the successive stages to progressively higher temperatures within the approximate range of 350° C. and 513° C. while maintaining a substantially uniform temperature in all the material at any given stage, separating the resulting ammonium chloride vapors from the residual solids, and condensing such vapors after being so separated.

2. The process for producing fertilizer compositions, which comprises the intermixture of potassium chloride and ammonium sulphate in dry condition in amounts approximating their molecular combining proportions, inducing a chemical reaction to transpose the acid radicals of the constituent materials by moving the material through a succession of physically separated treatment stages, heating the intermixture in the successive stages to progressively higher temperatures not exceeding a maximum of 513° C. while maintaining a substantially uniform temperature in all the material at any given stage, separating the resulting ammonium chloride vapors from the residual solids, and condensing such vapors after being so separated.

3. The process for producing fertilizer compositions, which comprises the intermixture of potassium chloride and ammonium sulphate in dry condition in amounts approximating their molecular combining proportions, inducing a chemical reaction to transpose the acid radicals of the constituent materials by moving the material through a succession of physically separated treatment stages, initially heating the intermixture to produce a state of incipient fusion, followed by heating in successive stages to progressively higher temperatures within the approximate range of 350° C. and 513° C., separating the resulting ammonium chloride vapors from the residual solids, and condensing such vapors after being so separated.

WALTON C. GRAHAM.